United States Patent
Chinthalapudi et al.

(10) Patent No.: US 10,219,188 B2
(45) Date of Patent: Feb. 26, 2019

(54) HANDLING IMS AND CSFB CALL AT USER EQUIPMENT IN WIRELESS NETWORK

(71) Applicant: Samsung Electronics Co., Ltd., Gyeonggi-do (KR)

(72) Inventors: Srinivas Chinthalapudi, Bangalore (IN); Prasad Basavaraj Dandra, Bangalore (IN)

(73) Assignee: Samsung Electronics Co., Ltd (KR)

( * ) Notice: Subject to any disclaimer, the term of this patent is extended or adjusted under 35 U.S.C. 154(b) by 26 days.

(21) Appl. No.: 15/278,763

(22) Filed: Sep. 28, 2016

(65) Prior Publication Data

US 2017/0134994 A1  May 11, 2017

(30) Foreign Application Priority Data

Nov. 11, 2015  (IN) .................... 6085/CHE/2015 PS
Mar. 31, 2016  (IN) .................... 6085/CHE/2015 CS

(51) Int. Cl.
| | |
|---|---|
| *H04W 36/00* | (2009.01) |
| *H04L 29/06* | (2006.01) |
| *H04W 76/18* | (2018.01) |
| *H04W 80/04* | (2009.01) |

(52) U.S. Cl.
CPC ......... *H04W 36/0022* (2013.01); *H04L 29/06* (2013.01); *H04L 65/1069* (2013.01); *H04L 65/1089* (2013.01); *H04L 69/24* (2013.01); *H04W 76/18* (2018.02); *H04W 80/04* (2013.01)

(58) Field of Classification Search
CPC ......... H04L 65/00; H04L 45/00; H04L 45/02; H04L 45/04; H04L 2012/64; H04L 12/64; H04L 65/102; H04L 12/6418; H04L 29/06176
USPC .................................................. 370/352-357
See application file for complete search history.

(56) References Cited

U.S. PATENT DOCUMENTS

| | | | | |
|---|---|---|---|---|
| 2010/0279648 | A1* | 11/2010 | Song | H04W 4/22 455/404.1 |
| 2011/0002327 | A1* | 1/2011 | Dwyer | H04W 48/18 370/352 |
| 2011/0188448 | A1* | 8/2011 | Griot | H04L 12/58 370/328 |
| 2014/0204901 | A1 | 7/2014 | Hedman et al. | |
| 2014/0349662 | A1 | 11/2014 | Ekici et al. | |

* cited by examiner

*Primary Examiner* — Brenda H Pham
(74) *Attorney, Agent, or Firm* — The Farrell Law Firm, P.C.

(57) ABSTRACT

Methods and apparatuses are provided for handling Internet protocol (IP) multimedia subsystem (IMS) and circuit switch fall back (CSFB) calls at a user equipment (UE) in a wireless network. A non-access stratum (NAS) of the UE receives an IMS indication when an IMS call is initiated at the UE. The NAS determines a state of the UE. The NAS performs an action based on the state of the UE to trigger one of the IMS call and a CSFB call.

22 Claims, 16 Drawing Sheets

HANDLING IMS AND CSFB CALL AT USER EQUIPMENT IN WIRELESS NETWORK

PRIORITY

This application claims priority under 35 U.S.C. § 119(a) to Indian Provisional Patent Application Serial No. 6085/CHE/2015 (PS), which was filed in the Indian Intellectual Property Office on Nov. 11, 2015, and to Indian Complete Patent Application Serial No. 6085/CHE/2015 (CS), which was filed in the Indian Intellectual Property Office on Mar. 31, 2016, the contents of which are incorporated herein by reference.

BACKGROUND

1. Field of the Disclosure

The present disclosure relates generally to Internet protocol (IP) multimedia subsystem (IMS) call initiation, and more particularly, to methods and apparatuses for triggering an IMS call or a circuit switch fall back (CSFB) call based on a state of the user equipment (UE).

2. Description of the Related Art

The introduction of the IMS has significantly impacted wireless network equipment and their deployment. The IMS and the deployment of long term evolution (LTE) have had a significant effect on the operation of UEs. Further, the problems resulting from IMS deployment on UEs has not been completely explored from a non-access stratum (NAS) perspective. From the NAS perspective IMS call triggers in abnormal states must be considered, and include, for example, initiating by a tracking area update (TAU) request or a service request, the attempting-to-update in a UE, when timer(s) T3411/T3402/T3430/T3440 are running, and when TAU_INITIATED and TAU Reject with Temp causes network failure/congestion.

According to an existing method and system, as shown in FIGS. 1A and 1B, FIG. 1A illustrates an activity diagram illustrating an IMS call drop scenario at a UE which incorporates a single subscriber identity module (SIM) and dual SIM, according to the prior art.

In step 102a, once the LTE NAS layer is in a registered state with a network, the UE initiates a call request, such as, for example, a voice over LTE (VoLTE)/IMS call with the network. Further, in step 104a, the UE transmits session initiation protocol (SIP) data and uplink (UL) data packets to the network (i.e., NAS data plane). Thereafter, in step 106a, the UE transmits a request to NAS control plane, with the request, for example, switching from an NAS idle mode to NAS connected mode. In step 108a, the UE detects abnormal states in the NAS layer (i.e., NAS layer at the UE). The abnormal states include, for example, ATTEMPTING_TO_UPDATE the NAS, timer T3411 running, T340 running, and TAU_INITIATED and TAU reject with Temp causes like network failure, congestion, etc. Thus, due to this abnormal service state (i.e., evolved packet system (EPS) mobility management (EMM)) at the NAS layer, the UE sends no response message to the network. In step 110a, the UE may receive a drop/delay the IMS call/CSFB call indication from the network due to time out.

Thus, the unwanted SIP packet transfer of queued data even after the IMS call has timed out may cause confusion in the network and lead to the call drop.

FIG. 1B illustrates another activity diagram illustrating an IMS call drop scenario at a UE which incorporates a multi SIM, according to the prior art.

In step 102b, the UE triggers the recovery procedure, such as local area identity (LAI) using SIM-2 before initiating the IMS call by a SIM-1 of the UE. In step 104b, the SIM-2 acquires a radio frequency (RF) stack to perform the recovery procedure (such as performing local area update (LAU)). In step 106b, the LTE NAS layer (i.e., associated with the SIM-1) is in a registered state with a network, and the SIM-1 of the UE initiates a call request, such as, for example, a voice over LTE (VoLTE)/IMS call with the network. Further, in step 108b, the UE transmits session initiation protocol (SIP) data and uplink (UL) data packets to the network (i.e., NAS data plane). Thereafter, in step 110b, the UE transmits a request to NAS control plane, with the request, for example, switching from an NAS idle mode to NAS connected mode. In step 112b, the UE transmits a connection establishment request (i.e., associated with the SIM-1) to an LTE-AS.

As the RF stack has been utilized by the SIM-2 in performing recovery procedure, signaling, or other high priority activity, this may result in a poor user experience due to the lack of prioritization in a dual SIM dual standby (DSDS) UE and the unavailability of the RF for the SIM-1 that is triggering the IMS Call.

In step 114b, the UE may receive drop/delay the IMS call/CSFB call indication from the network due to time out.

This problem applies to two-receiver-DSDS (2RX-DSDS) if the second stack is busy in high priority UL activity. Similar problems (e.g., call drop, delay in establishing a voice call, and the like) persist in a dual SIM dual active (DSDA) UE.

In case of the DSDS UE, as since a VoLTE call is a packet switched (PS) call, and when circuit switched (CS) paging is received on a second SIM, there is a possibility that the VoLTE signaling may be interrupted since a modem may not be able to distinguish between a voice call and an ongoing video call. Hence, the VoLTE call may be disconnected and a default priority may be given to the CS call, continuing the poor user experience.

SUMMARY

An aspect of the embodiments of the present disclosure provides a mechanism for handing an IMS call and a circuit switch fall back (CSFB) call at a UE in wireless network.

According to an aspect of the present disclosure, a method is provided for handling IMS and CSFB calls at a UE in a wireless network. An NAS of the UE receives an IMS indication when an IMS call is initiated at the UE. The NAS determines a state of the UE. The NAS performs an action based on the state of the UE to trigger one of the IMS call and a CSFB call. According to an aspect of the present disclosure, a method is provided for handling IMS and CSFB calls at a UE in wireless network. An NAS of the UE receives an IMS indication when an IMS call is initiated at the UE. The NAS determines whether a connection to a network entity in the wireless network is successful. The IMS call is triggered when the connection to the network entity is successful. The CSFB call is triggered when the connection to the network entity is not successful.

According to an aspect of the present disclosure, a method is provided for handling an IMS at a UE in a wireless network. An NAS of the UE receives an IMS indication when the IMS call is initiated from a first SIM at the UE. The NAS detects that the UE is in a connected mode and a second SIM at the UE is signaling data to the wireless network. The NAS blocks the signaling of data by the second SIM. The NAS triggers the IMS call from the first SIM. According to an aspect of the present disclosure, a UE is provided for handling IMS and CSFB calls in a wireless network. The UE includes a memory, a processor, and an NAS coupled to the processor and memory. The NAS is configured to receive an IMS indication when an IMS call is initiated at the UE, determine a state of the UE, and perform an action based on the state of the UE to trigger one of an IMS call and a CSFB call.

According to an aspect of the present disclosure, a UE is provided for handing IMS and CSFB calls in a wireless network. The UE includes a memory, a processor, and an NAS, coupled to the processor and memory. The NAS is configured to receive an IMS indication when an IMS call is initiated at the UE, determine whether a connection to a network entity in the wireless network is successful, trigger the IMS call when the connection to the network entity is successful, and trigger the CSFB call when the connection to the network entity is not successful.

According to an aspect of the present disclosure, a UE is provided for handing an IMS call in a wireless network. The UE includes a memory, a processor, and an NAS coupled to the processor and memory. The NAS is configured to receive an IMS indication when the IMS call is initiated from a first SIM at the UE, detect that the UE is in a connected mode and a second SIM at the UE is signaling data to the wireless network, block the signaling of data by the second SIM, and trigger the IMS call from the first SIM.

According to an aspect of the present disclosure, a method is provided for handling calls at a UE in a wireless network. An NAS of the UE determines whether the UE is in a TAU initiated state upon initiating of an IMS call. The NAS determines whether the UE is attempting to update and one or more retransmission timers are running, when the UE is not in a TAU initiated state. The NAS triggers a CSFB call, when at least one of the UE is not attempting to update and the one or more retransmission timers are not running. The NAS triggers the CSFB call or the IMS call in accordance with whether a TAU accept message is received, when the UE is in a TAU initiated state or when the UE is attempting to update and one or more retransmission timers are running.

BRIEF DESCRIPTION OF THE DRAWINGS

The above and other aspects, features, and advantages of the present disclosure will be more apparent from the following detailed description when taken in conjunction with the accompanying drawings, in which.

DETAILED DESCRIPTION

Figure 1A:
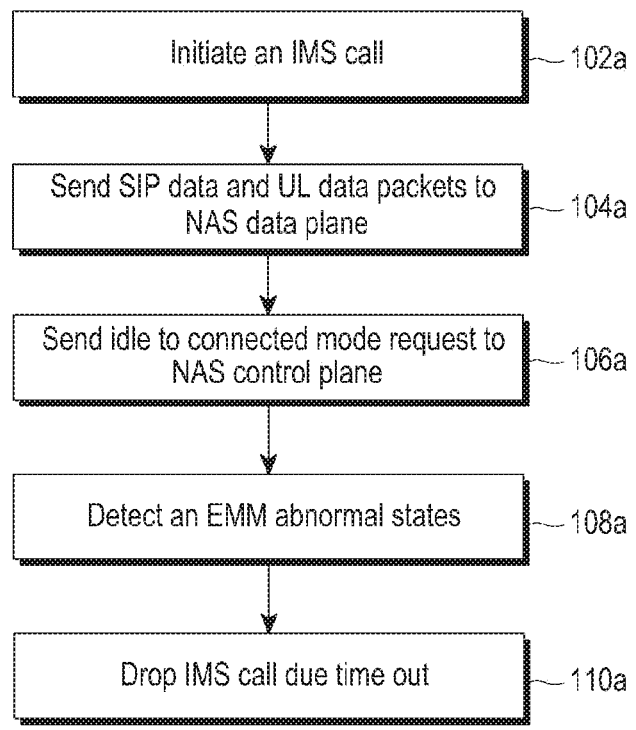
FIG. 1A is flow diagram illustrating an IMS call drop in a single SIM and a dual SIM scenario.

Embodiments of the present disclosure are described in detail with reference to the accompanying drawings. The same or similar components may be designated by the same or similar reference numerals although they are illustrated in different drawings. Detailed descriptions of constructions or processes known in the art may be omitted to avoid obscuring the subject matter of the present disclosure.

The term "or", as used herein, refers to a non-exclusive "or", unless otherwise indicated. The examples used herein are intended to facilitate an understanding of the ways in which the embodiments can be practiced and to further enable those skilled in the art to practice the embodiments. Accordingly, the examples should not be construed as limiting the scope of the embodiments described herein.

Generally, LTE is a technology proposed by the $3^{rd}$ generation partnership project (3GPP) which supports a high data rate (e.g., 50 Mbps uplink (UL) and 100 Mbps downlink (DL)) and is purely packet switched (PS) system. A PS system handles massive types of data. In order to improve IMS call procedures in a multimode device capable of LTE/$3^{rd}$ generation (3G)/$2^{nd}$ generation (2G), the 3GPP has provided one or more mechanisms to enhance signaling procedures to a modem. However, the one or more mechanisms provided by the 3GPP have not been accurate in handling an IMS call on an LTE network when a UE is in an abnormal state.

The abnormal sate may include one or more of IMS calls triggered in an evolved universal terrestrial radio access network (EUTRAN) when the UE is attempting to update and one or more timers (e.g. T3411/T3402/T3346) are running, IMS calls triggered in the EUTRAN when the UE is in a service request initiated state and one or more timers are running, IMS calls triggered in EUTRAN when the UE is waiting for TAU accept/reject from a network entity and one or more timers are running, IMS calls triggered in the EUTRAN during a UE initiated TAU procedure with a TAU active flag set to true, IMS calls triggered in the EUTRAN when the UE has received TAU reject/lower layer failure for the TAU with the TAU active flag as true, and IMS calls triggered from the UE when reselection is performed from the LTE to global system for mobile communication (GSM)/universal mobile telecommunications system (UMTS) radio access technology (RAT).

Figure 1B:
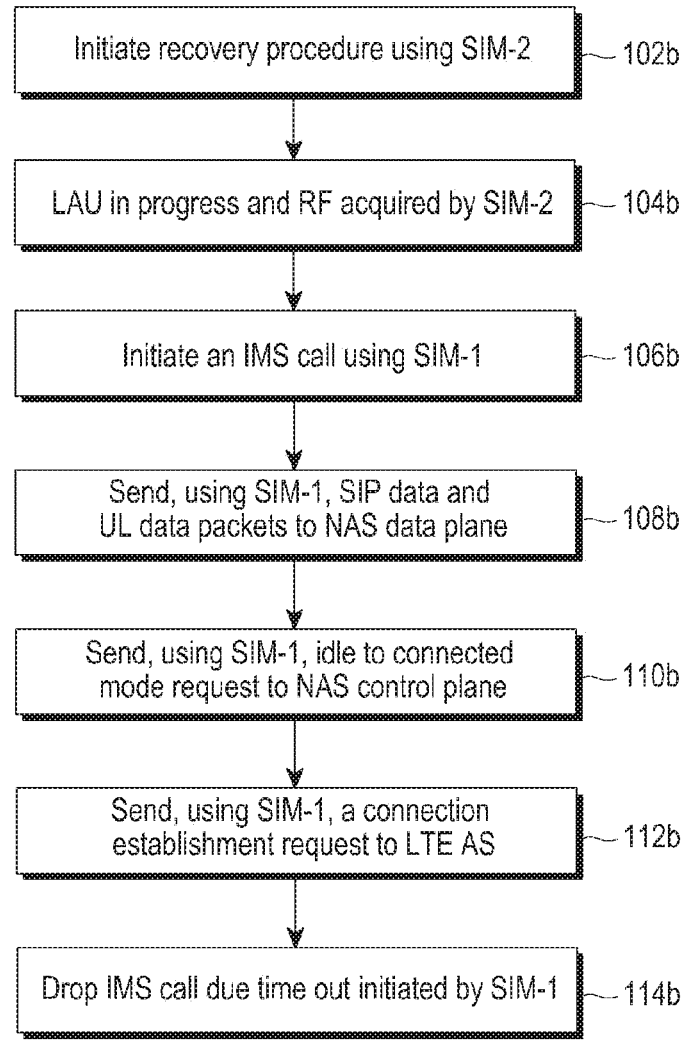
FIG. 1B is flow diagram illustrating an IMS call drop in a multi SIM scenario.

Unlike conventional systems and methods, as shown in FIGS. 1A and 1B, embodiments of the present disclosure provide the UE, when, during a TAU retransmit timer (T3411/T3402/T3430/T3440) or upon a TAU initiation or service request and waiting for a response from the network, the UE initiates a VoLTE/IMS call, then high layers can provide a request to the NAS to check whether the UE is in a proper state to continue the call in the LTE, or whether it can move to a legacy radio access technology (RAT) to complete the call in the CS domain. When the NAS receives this indication, the UE can immediately trigger the TAU irrespective of its timer states. After sending to the TAU that its attempts failed or max attempts are reached, this failure is indicated to the IMS client/dialer so that the IMS client will not trigger any further data and pending data will be flushed. This will avoid unnecessary re-transmissions of the SIP data packets from the IMS client. In case of a failure from the NAS, the IMS client/dialer can initiate a CS voice call by moving to a legacy RAT to complete the user request.

Unlike conventional systems and methods, embodiments of the present disclosure provide a unique evolved packet system (EPS) mobility management (EMM) that caters to IMS call requests to handle or prioritize the IMS mobile originated (MO)/MT call requests when the UE is in an EMM abnormal state, such as, for example, attempting update/attach and running one or more timers T3411/T3410/T3430.

Unlike conventional systems and methods, the proposed mechanism increases the success rate of VoLTE/IMS calls in DSDS devices where an RF is shared between two stacks.

Figure 2:
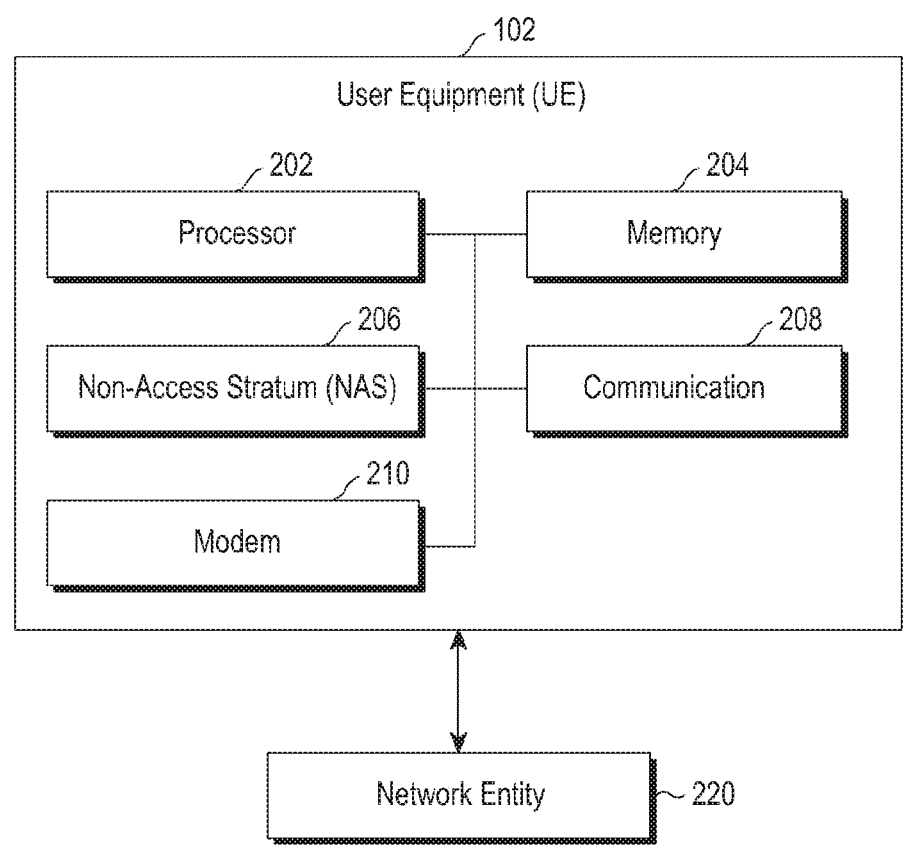
FIG. 2 is a diagram illustrating components of a UE for handling an IMS and CSFB call in wireless network, according to an embodiment of the present disclosure.

FIG. 2 is a diagram illustrating components of a UE communicating with a network entity for handing an IMS call and a CSFB call in wireless network, according to an embodiment of the present disclosure.

A UE 102 includes a processor 202, a memory 204 coupled to the processor 202, a NAS 206 coupled to the processor 202, a communication unit 208, and a modem 210. The UE 102 may be embodied as a laptop, a desktop computer, a mobile phone, a mobile station, a mobile terminal, a smart phone, a personal digital assistant (PDA), a tablet, a phablet, or any other electronic device.

In an embodiment, the NAS 206 can be configured to receive an IMS indication when the IMS call is initiated at the UE 102. The IMS indication notifies the NAS 206 that the IMS call has been triggered by the UE 102.

Further, the NAS 206 can be configured to detect a state of the UE 102. The state of the UE 102 can include the abnormal state, such as, for example, initiation of TAU, running or expiration of timers, one or more of timers T3411, T3346, T3402 or T3430, dropping a call (IMS/CSFB), delaying of a call, or the like.

Call drops and call delays based on timers are shown below in Table 1.

TABLE 1

Call Delays/Drops Based on Timers

| Timer Name | Timer Value |
| --- | --- |
| T3411(At TAU failure due to lower layer failure, T3430 timeout or TAU rejected) | 10 s |
| T3346(TAU reject received with a timer value for T3346) | 15-30 mins |
| T3402(TAU accept with EMM cause #16 or #17 and the attempt counter is equal to 5 for CS/PS mode 2 UE, or TAU accept with EMM cause #22) | Default 12 mins |
| T3430(TAU request sent) | 15 s |

Further, the NAS 206 can be configured to perform an action based on the state of the UE 102 to trigger one of the IMS call and a CSFB call, as described in greater detail below with respect to FIGS. 4-7.

The NAS 206 can be configured to detect whether a connection to a network entity 220 in the wireless network is successful or unsuccessful. The UE 102 can be connected to the network entity 220.

Further, the NAS 206 can be configured to perform triggering the IMS call when the connection to the network entity is successful, or triggering the CSFB call when the connection to the network entity is unsuccessful.

The NAS 206 can be configured to receive an IMS indication when the IMS call is initiated from the first SIM at the UE 102. Further, the NAS 206 can be configured to detect that the UE 102 is in a connected mode, and a second SIM at the UE 102 is signaling data to the wireless network. Further, the NAS 206 can be configured to block the signaling of data at the second SIM and trigger the IMS call from the first SIM.

The modem 210 can be configured to detect that CS paging is received at the second SIM while the IMS call is ongoing on the first SIM, and ignore the CS paging at the second SIM.

The memory 204 may include one or more computer-readable storage media. The memory 204 may include non-volatile storage elements. Examples of such non-volatile storage elements may include magnetic hard discs, optical discs, floppy discs, flash memories, or forms of electrically programmable read only memories (EPROMs) or electrically erasable and programmable read only memories (EEPROMs). In addition, the memory 204 may, in some examples, be considered a non-transitory storage medium. The term "non-transitory" may indicate that the storage medium is not embodied in a carrier wave or a propagated signal. However, the term "non-transitory" should not be interpreted that the memory 204 is non-movable. In some examples, the memory 204 can be configured to store larger amounts of information than the memory. In certain examples, a non-transitory storage medium may store data that can, over time, change (e.g., in random access memory (RAM) or cache). The communication unit 208 can be configured to communicate internally between the units and externally with the networks.

FIG. 2 shows a limited overview of the units of the UE 102 but it is to be understood that other embodiments are not limited thereon. In other embodiments, the UE 102 may include fewer or more units. Further, the labels or names of the units are used only for illustrative purposes and do not limit the scope of the disclosure. One or more units can be combined together to perform same or substantially similar function in the UE 102.

Figure 3:
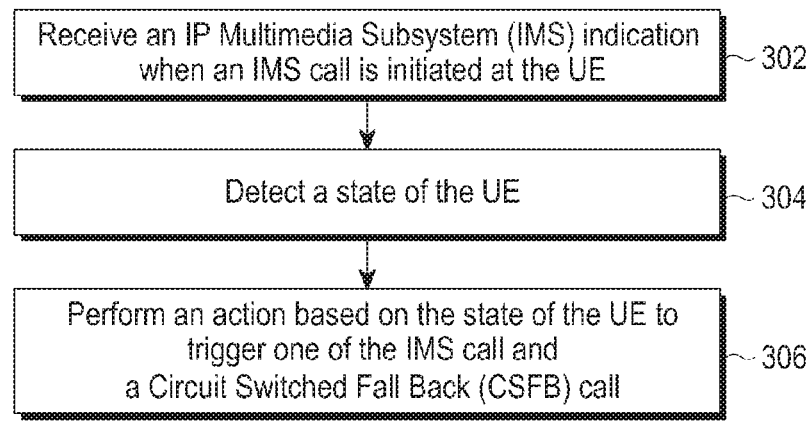
FIG. 3 is a flow diagram illustrating a method for handling an IMS and CSFB call at the UE in wireless network, according to an embodiment of the present disclosure.

FIG. 3 is flow diagram illustrating a method for handling an IMS call and a CSFB call at a UE, according to an embodiment of the present disclosure. The method is performed by an NAS in a UE.

In step 302, the method includes receiving an IMS indication when an IMS call is initiated at the UE. In an embodiment, the method allows the NAS 206 to receive the IMS indication when the IMS call is initiated at the UE 102.

In step 304, the method includes detecting a state of the UE 102. In an embodiment, the method allows the NAS 206 to detect the state of the UE 102.

In step 306, the method includes performing an action based on the state of the UE 102 to trigger one of the IMS call and the CSFB call. In an embodiment, the method allows the NAS 206 to perform the action based on the state of the UE 102 to trigger one of the IMS call and the CSFB call.

The various actions, acts, blocks, steps, or the like in the method may be performed in the order presented, in a different order, or simultaneously. Further, in some embodiments, some of the actions, acts, blocks, steps, or the like may be omitted, added, modified, skipped, or the like without departing from the scope of the disclosure.

Figure 4:
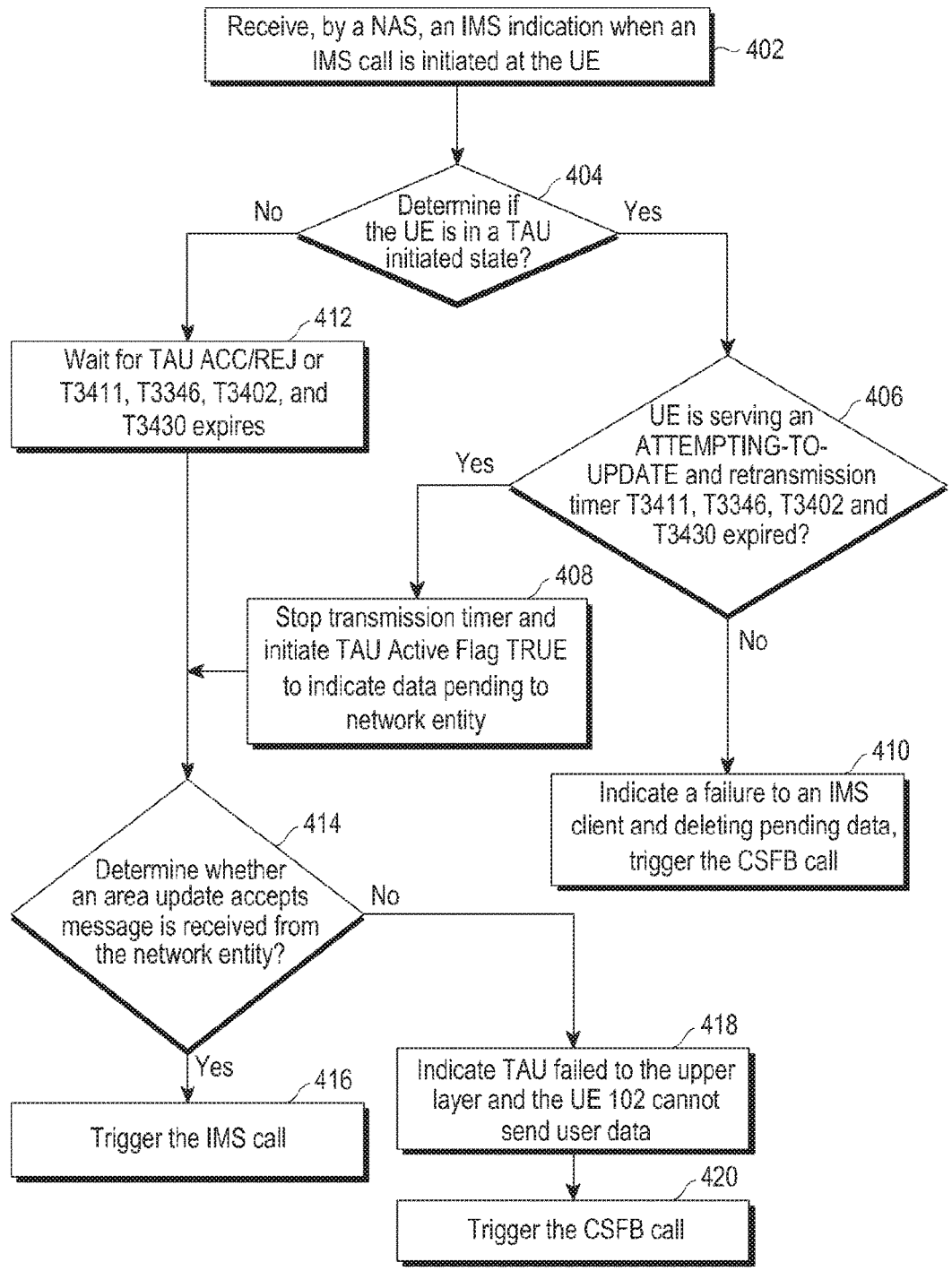
FIG. 4 is a flow diagram illustrating a method for handling an IMS and CSFB call at a UE that is attempting to update when a retransmission timer expires in wireless network, according to an embodiment of the present disclosure.

FIG. 4 is a flow diagram illustrating a method for handling an IMS call and a CSFB call at a UE serving an attempt to update when a retransmission timer expires in a wireless network, according to an embodiment of the present disclosure. The method is performed by an NAS in a UE.

In step 402, the method includes receiving, by the NAS 206, an IMS indication when an IMS call is initiated at the UE 102.

In step 404, the method includes determining whether the UE 102 is in a TAU initiated state. In an embodiment, the method allows the NAS 206 to detect the state of the UE 102.

If the NAS 206 detects that the UE 102 is in the TAU initiated state, the NAS 206 determines whether the UE 102 is serving the ATTEMPTING-TO-UPDATE and whether one or more of retransmission timers T3411, T3346, T3402, and T3430 have expired, in step 406.

If the UE 102 is determined to be serving the ATTEMPTING-TO-UPDATE and the one or more of the retransmission timers T3411, T3346, T3402, and T3430 have expired, the method includes stopping the transmission timer and setting the TAU active flag to "true", in step 408, to indicate data pending to the network entity 220. In an embodiment, the method allows the NAS 206 to stop the transmission timer and set the TAU Active flag. The method then proceeds to step 414 as described below.

If the UE 102 is not serving the ATTEMPTING-TO-UPDATE and the one or more of the retransmission timers T3411, T3346, T3402, and T3430 are running, the method includes indicating a failure to an IMS client and deleting the pending data, in step 410, thereby triggering the CSFB call. In an embodiment, the method allows the NAS 206 to indicate the failure to the IMS client and deleting the pending data.

If the NAS 206 determines that the UE 102 is not in a TAU initiated state, the method includes waiting for a TAU accept/reject or unit one or more timers expire, in step 412.

In an embodiment, the method allows the NAS 206 to wait for the TAU accept/reject or until the one or more timers expire.

Further, in step 414, the method includes determining whether an area update accepts message is received from the network entity 220. In an embodiment, the method allows the NAS 206 to make the determination.

If the NAS 206 determines that the area update accepts message is received from the network entity 220, the method includes triggering the IMS call, in step 416. In an embodiment the method allows the NAS 206 to trigger the IMS call.

If the NAS 206 determines that the area update accepts message is rejected from the network entity 220, the method includes indicating that the TAU failed to an upper layer and that the UE 102 cannot send user data, in step 418. In an embodiment, the method allows the NAS 206 to provide the indication.

In step 420, the method includes triggering the CSFB call. In an embodiment, the method allows the NAS 206 to trigger the CSFB call.

The various actions, acts, blocks, steps, or the like in the method may be performed in the order presented, in a different order, or simultaneously. Further, in some embodiments, some of the actions, acts, blocks, steps, or the like may be omitted, added, modified, skipped, or the like without departing from the scope of the disclosure.

Figure 5:
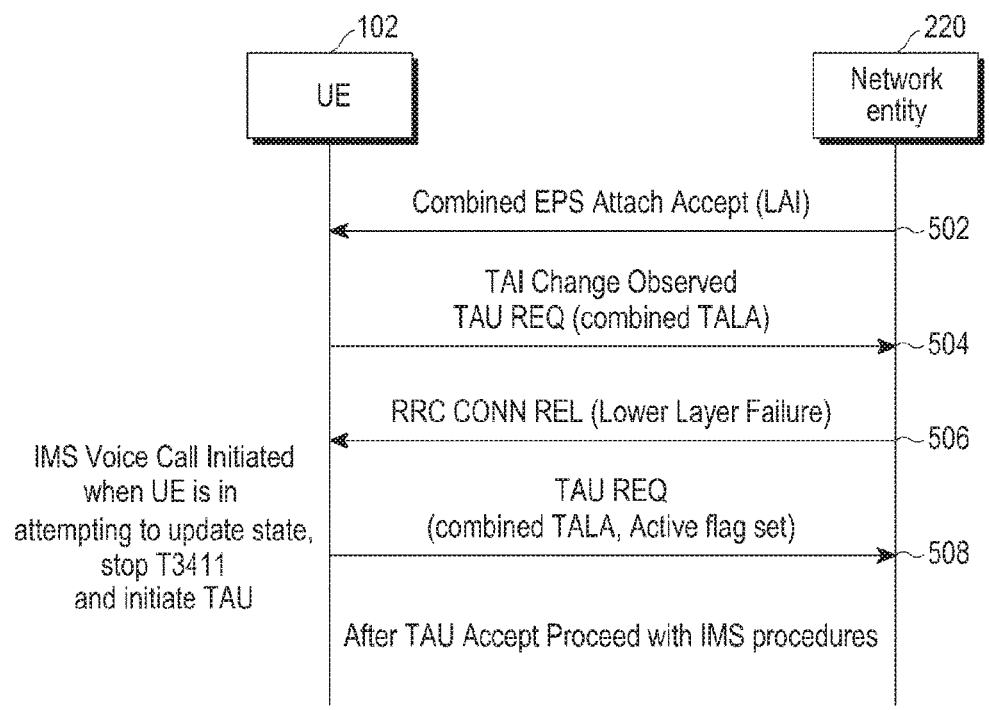
FIG. 5 is a sequence diagram illustrating operations performed for handling an IMS and CSFB call when the UE is registered and attempting to update, according to an embodiment of the present disclosure.

FIG. 5 is a sequence diagram illustrating operations performed for handling the IMS call and the CSFB call in the UE in a registered and attempting to update state, according to an embodiment of the present disclosure.

Unlike conventional systems and methods, the proposed mechanism allows the UE 102 to immediately perform T3411 timer expiry actions and set the active flag as "true" in the TAU request. If the TAU is completed successfully, the UE 102 can therefore proceed with IMS signaling procedures and continue the IMS call. Thus, the proposed method can be utilized to effectively handle the MO Voice Call when the UE 102 is in a registered, attempting to update, update-MM state.

In an embodiment, the NAS 206 (i.e. the NAS 206 in the UE 102) receives a combined evolved packet system (EPS) attach accept (location area identity (LAI)) from the network entity 220, in step 502. The NAS 206 broadcasts the TAI change observed indication and the TAU requests message (combined TA LA) to the network entity 220, in step 504. Further, the network entity 220 broadcasts a lower layer failure indication, to the NAS 206, in an RRC connection, in step 506. The NAS 206 broadcasts the TAU request message to the network entity 220 by setting the active flag to "true", in step 508, thereby triggering the IMS call.

Figure 6:
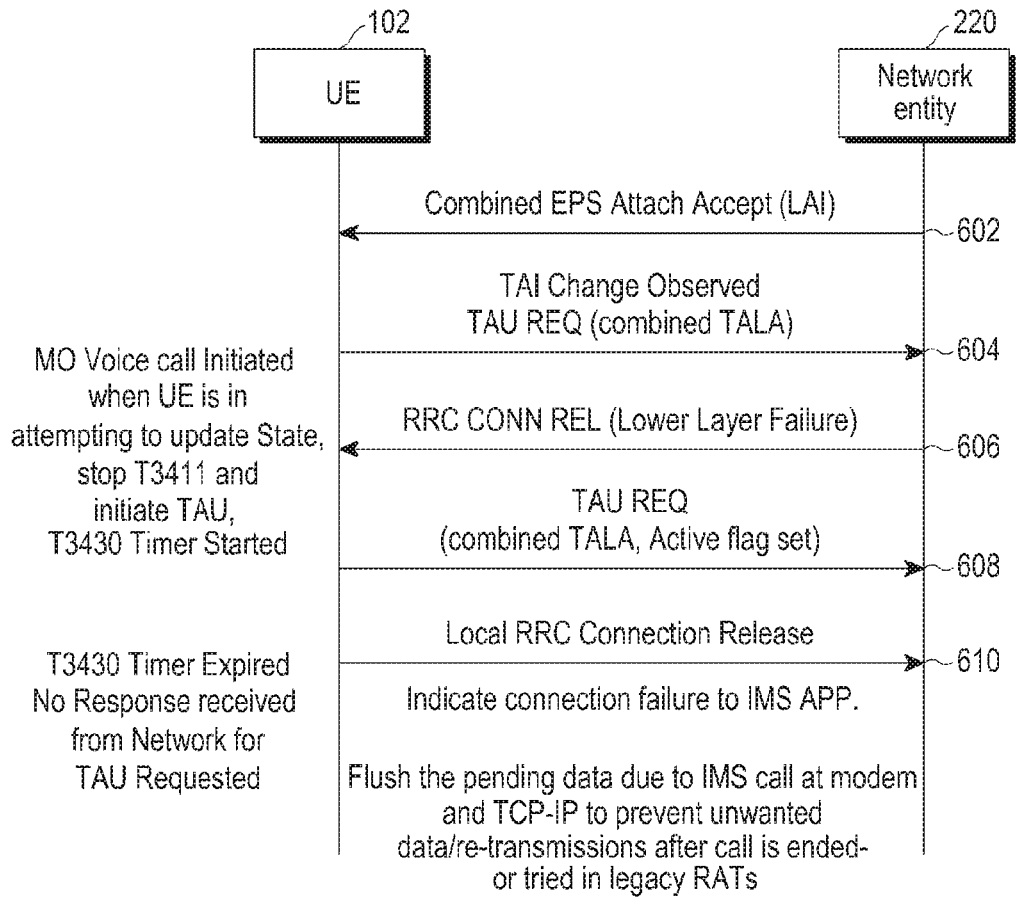
FIG. 6 is a sequence diagram illustrating operations performed for handling a pending IMS call in the case of TAU failure due to timer expiration, according to an embodiment of the present disclosure.

FIG. 6 is a sequence diagram illustrating operations performed in handling a pending IMS call in case of a TAU failure due to expiration of one or more timers, according to an embodiment of the present disclosure.

Unlike conventional methods and systems, the proposed mechanism can effectively handle the IMS call and the CSFB call during an MO voice/emergency call pending when the UE 102 initiates the TAU procedure with active flag set to "true" and during an RRC connection release request, received from the network entity 220, with lower layer failure/normal before receiving the TAU accept/reject request message.

According to an embodiment, the NAS 206 releases the RRC connection locally, in response to the request received from the network entity 220, and switches to GSM enhanced data rates for GSM evolution (EDGE) radio access network (GERAN)/UTRAN to support the voice call through the CS.

Also, the NAS 206 can send an indication to the IMS client so that pending data can be flushed at the modem 210 and a transmission control protocol-Internet protocol (TCP-IP).

In an embodiment, the NAS 206 (i.e. the NAS 206 in the UE 102) receives the combined EPS attach accept (LAI) from the network entity 220, in step 602. The NAS 206 broadcasts the TAI change observed indication and the TAU requests message (combined TA LA) to the network entity 220, in step 604. Further, the network entity 220 broadcasts a lower layer failure indication, to the NAS 206, in the RRC connection, in step 606. The NAS 206 broadcasts the TAU request message to the network entity 220 by setting the active flag to "true", in step 608.

The NAS 206 can be configured to release the RRC connection locally, in step 610. Further, the NAS 206 can be configured to indicate the connection failure to the IMS client. Furthermore, the NAS 206 can be configured to flush the pending data due to the IMS call at modem 210 and the TCP-IP to prevent unwanted data/re-transmissions of the data packets after the call is ended or attempted in legacy RATs.

Figure 7:
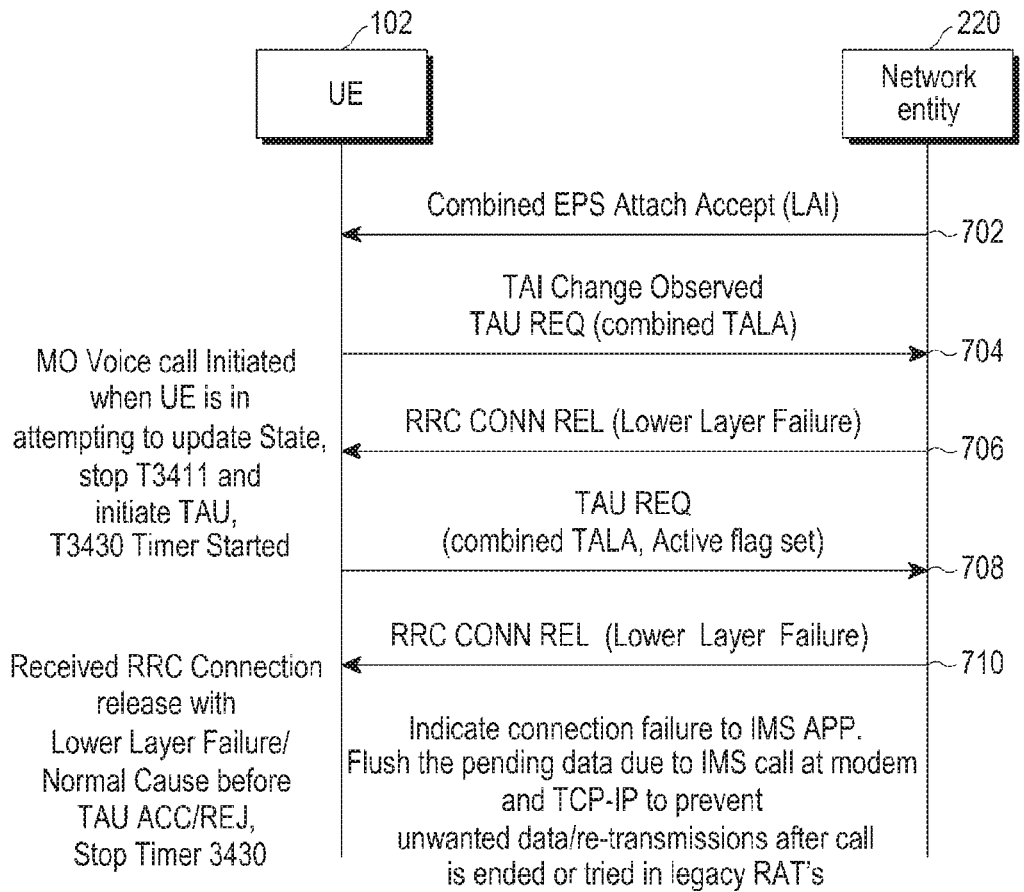
FIG. 7 is a sequence diagram illustrating operations performed for handling an IMS voice/emergency call when the UE receives a lower layer failure for a TAU request message, according to an embodiment of the present disclosure.

FIG. 7 is a sequence diagram illustrating operations performed for handling an IMS voice/emergency call in case the UE receives a lower layer failure request message, from the network entity, in response to the received TAU request message from the NAS 206, according to an embodiment of the present disclosure.

In an embodiment, the NAS 206 receives the combined EPS attach accept (LAI) from the network entity 220, in step 702. The NAS 206 broadcasts the TAI change observed indication and the TAU requests message (combined TA LA) to the network entity 220, in step 704. Further, the network entity 220 broadcasts a lower layer failure indication, to the NAS 206, in an RRC connection, in step 706. The NAS 206 broadcasts the TAU request message to the network entity 220 by setting the active flag to "true", in step 708.

If the NAS 206 receives the RRC connection failure request message from the network entity 220 before the TAU accept/reject request message, in step 710. The NAS 206 can stop the timer T3430 and indicate the RRC connection failure to the IMS client. Further, the NAS 206 can be configured to flush the pending data due to the IMS call at the modem 210 and the TCP-IP to prevent unwanted data/re-transmissions of the data packets after the call is ended or attempted in legacy RATs.

Figure 8:
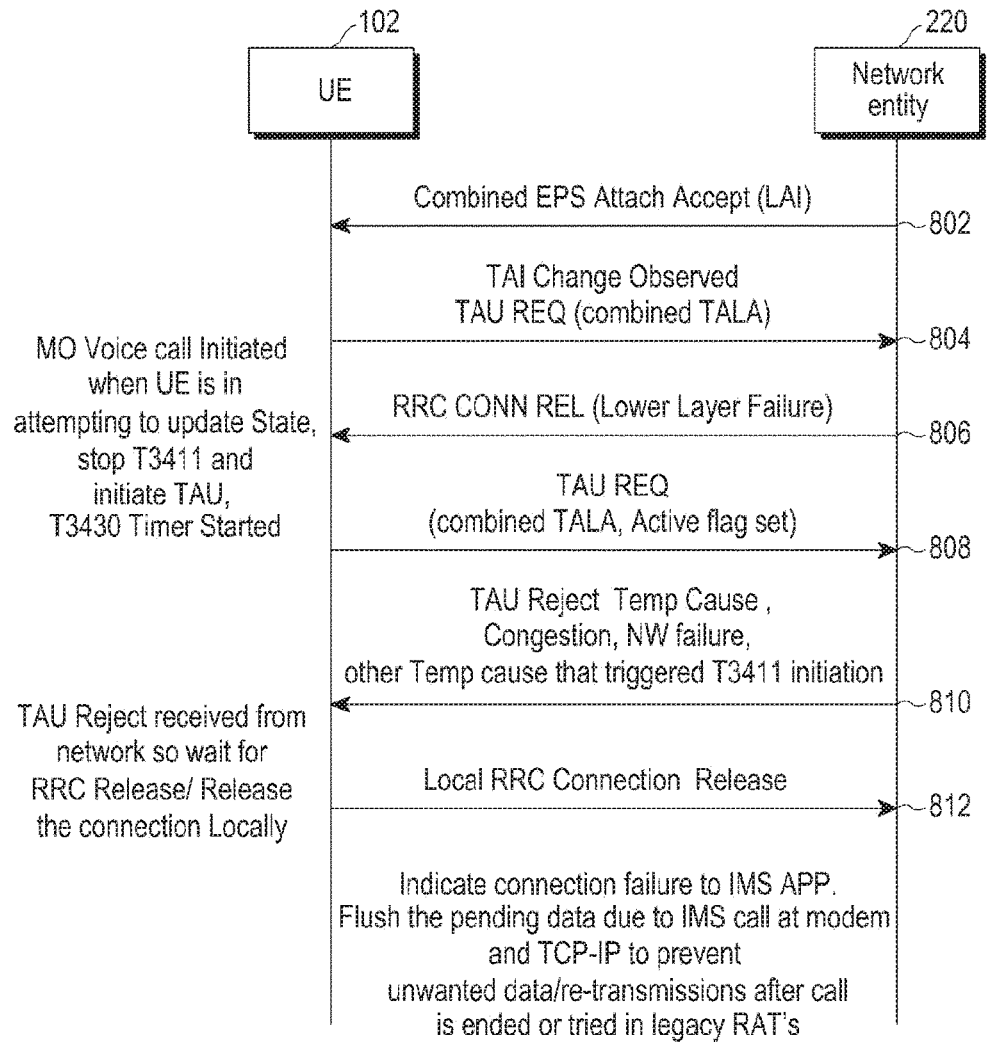
FIG. 8 is a sequence diagram illustrating operations performed for handling an IMS call when a UE receives a TAU reject, according to an embodiment of the present disclosure.

FIG. 8 is a sequence diagram illustrating handling of an IMS Call when the UE receives the TAU reject message, according to an embodiment of the present disclosure.

In an embodiment, the NAS 206 receives the combined EPS attach accept (LAI) from the network entity 220, in step 802. The NAS 206 broadcasts the TAI change observed indication and the TAU requests message (combined TA LA) to the network entity 220, in step 804. Further, the network entity 220 broadcasts a lower layer failure indication, to the NAS 206, in the RRC connection, in step 806. The NAS 206, thereon, broadcasts the TAU request message to the network entity 220 by setting the active flag to "true", in step 808.

Further, the NAS 206 receives the TAU Reject message with temporary cause, such as, for example, NW failure/congestion/MSC not reachable, in step 810. The NAS 206 releases the RRC connection locally and switches to the GERAN/UTRAN to support voice call through CS, in step 812. Also, the NAS 206 can send the indication to the IMS client (i.e., IMS application at the UE 102) so that pending data can be flushed at the modem 210 and the TCP-IP.

Figure 9:
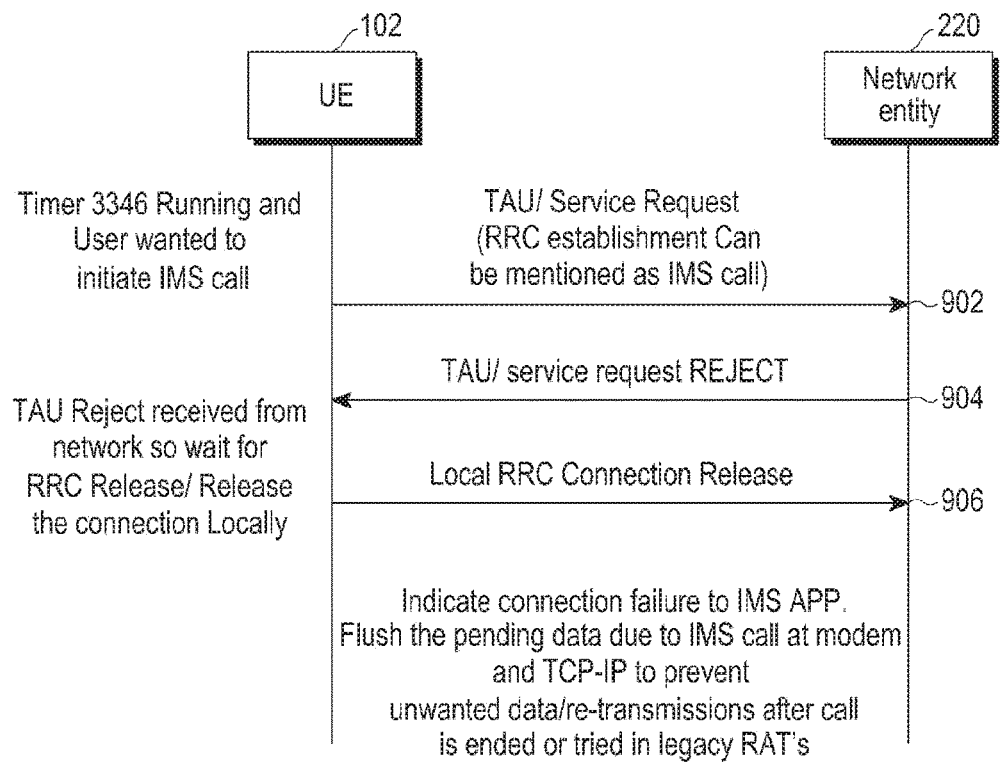
FIG. 9 is a sequence diagram illustrating operations performed for handling an IMS call while a congestion timer is running, according to an embodiment of the present disclosure.

FIG. 9 is a sequence diagram illustrating operations performed for handling CS paging during IMS call establishment, according to an embodiment of the present disclosure.

In an embodiment, the UE 102 broadcasts the TAU/service request (RRC establishment can be mentioned as the IMS call) to the network entity 220, in step 902. Further, the network entity 220, in response to received TAU/service request, broadcasts the TAU/service request reject, in step 904, to wait for RRC release of the connection locally, in step 906.

Therefore, the UE 102 indicates a connection failure to the IMS client. Further, the UE 102 can flush the pending data due to an IMS call at the modem 210 and the TCP-IP, to prevent unwanted data/re-transmissions after call is ended or attempted in legacy RATs.

Figure 10:
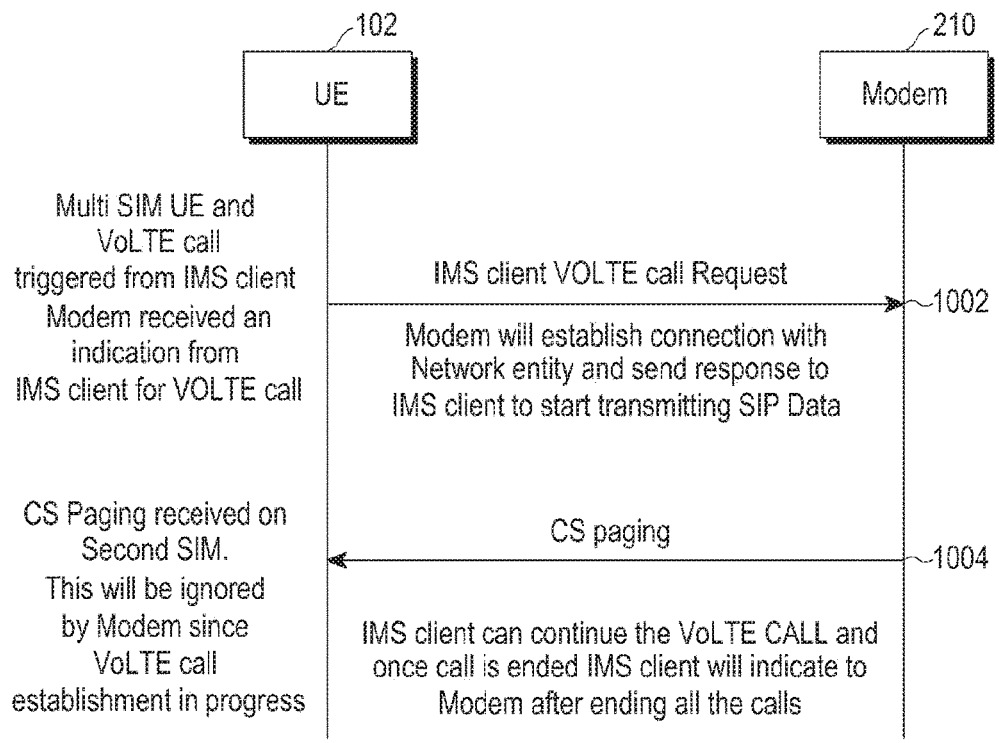
FIG. 10 is a sequence diagram illustrating operations performed for handling CS paging during IMS call establishment, according to an embodiment of the present disclosure.

FIG. 10 is a sequence diagram illustrating operations performed for handling CS paging during the IMS call establishment, according to an embodiment of the present disclosure.

The UE 102 is capable of supporting multi SIM, and if the VoLTE call is triggered from the IMS client, the modem 210 receives an indication from the IMS client for a VoLTE call, in step 1002. The modem connection with the network entity 220 is established in response to an indication received from the UE 102. The UE 102 therefore sends a response to the IMS client to start transmitting an SIP data.

Further, the modem 210 detects that CS paging is received at the second SIM while the IMS call is ongoing on the first SIM, in step 1004. Thus, the modem 210 can be configured to ignore the CS paging and continue the IMS call by ending the VoLTE call, and once the call is ended the IMS client can send an indication to the modem 210 that the call has ended.

The UE 102 initiates the IMS call when the UE 102 is in registered and idle states and either a TAU with an active flag or a service request is triggered. CS paging is received from the network entity, but the modem 210 receives the indication indicating the VoLTE call establishment is in progress, therefore the modem 210 can ignore the CS paging and continue the VoLTE call.

Unlike conventional systems and methods, the embodiments prioritize the IMS call request in the UE 102 during the abnormal states, occurring at the UE 102, to maximize the chances of successful IMS call establishment.

Figure 11:
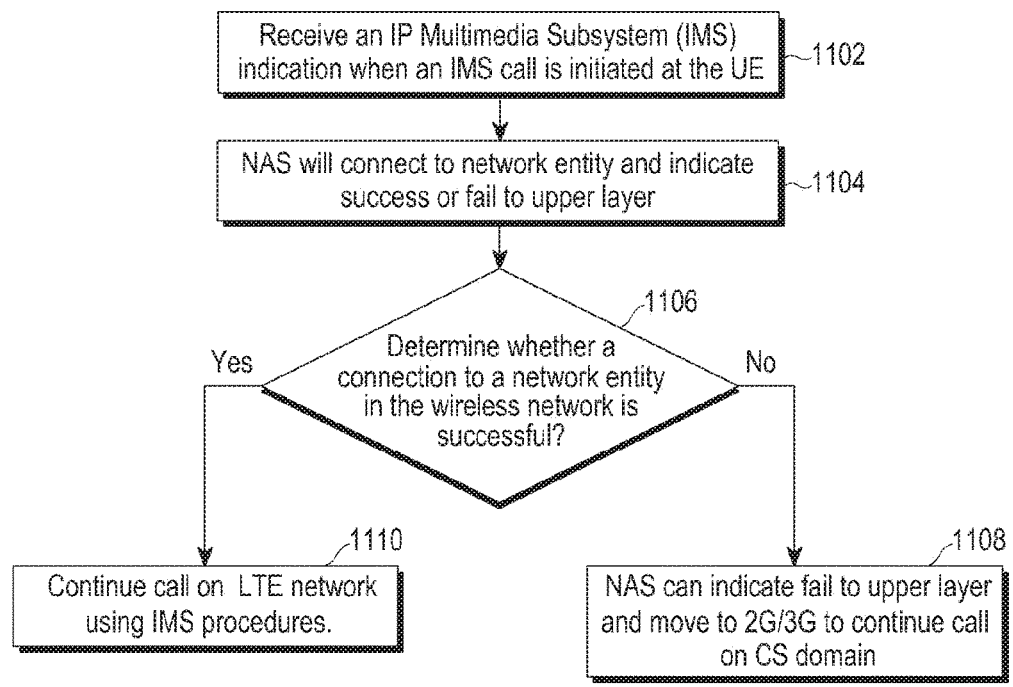
FIG. 11 is a flow diagram illustrating a method for IMS call handling of an IMS call flow indicating success and failure to an upper layer, according to an embodiment of the present disclosure.

FIG. 11 is a flow diagram illustrating a method for handling an IMS Call in EMM abnormal states, according to an embodiment of the present disclosure.

In step 1102, a method includes receiving an IMS indication when an IMS call is initiated at the UE 102. In an embodiment, the method allows the NAS 206 to receive the IMS indication.

In step 1104, the method includes connecting the NAS 206 to the network entity 220 and indicating an accept/reject request message to the upper layer. In an embodiment, the method allows the NAS 206 to provide the indication to the upper layer.

In step 1106, the method includes determining whether the connection to the network entity 220 in the wireless network is successful. In an embodiment, the method allows the NAS 206 to make the determination.

If the connection to the network entity 220 in the wireless network is unsuccessful, the method includes sending the failure indication to the upper layer and triggering the CSFB call (move to 2G/3G to continue the call on the CS domain), in step 1108. In an embodiment, the method allows the NAS 206 to send the failure indication and trigger the CSFB call.

If the connection to the network entity 220 in the wireless network is successful, the method includes triggering the IMS call (continue call on LTE network using IMS procedures), in step 1110. In an embodiment, the method allows the NAS 206 to trigger the IMS call.

The various actions, acts, blocks, steps, or the like in the method may be performed in the order presented, in a different order, or simultaneously. Further, in some embodiments, some of the actions, acts, blocks, steps, or the like may be omitted, added, modified, skipped, or the like without departing from the scope of the disclosure.

Figure 12:
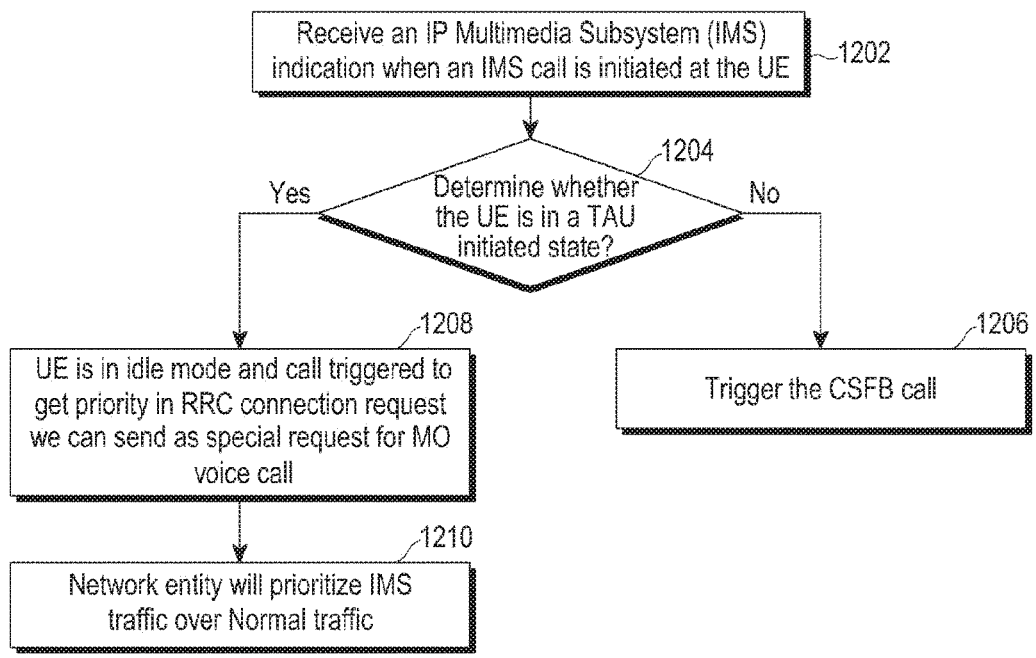
FIG. 12 is a flow diagram illustrating a method for handling an IMS call flow in evolved packet system (EPS) mobility management (EMM) abnormal states, according to an embodiment of the present disclosure.

FIG. 12 is a flow diagram illustrating a method for handling an IMS call in EMM abnormal states, according to an embodiment of the present disclosure.

In step 1202, a method includes receiving the IMS indication when the IMS call is initiated at the UE 102. In an embodiment, the method allows the NAS 206 to receive the IMS indication.

In step 1204, the method includes determining whether the state of the UE 102 is a TAU initiated state. In an embodiment, the method allows the NAS 206 to determine the state of the UE 102.

If the NAS 206 detects that the UE 102 is not in the TAU initiated state, the method includes triggering, by the NAS 206, the CSFB call, by following the existing 3G protocols, in step 1206.

If the NAS 206 detects that the UE 102 is in the TAU initiated state, the method includes prioritizing by the NAS 206 (in the UE 102) the MO voice call in the RRC connection request, in step 1208. In step 1210, the method includes sending a request, by the NAS 206, to the network entity 220 to prioritize IMS traffic over normal traffic.

For example, when a user initiates the IMS call and the UE 102 is in the registered and idle state, either a TAU with an active flag or a service request will be triggered. Further, the connection request for such a message can be considered on priority by the network entity 220, hence establishment of the IMS call in the RRC connection request is introduced, usage of such an establishment can make the network entity aware of the reason for the connection request so that the network entity 220 can prioritize and minimize problems such as congestion, network failures, or the like.

The various actions, acts, blocks, steps, or the like in the method may be performed in the order presented, in a different order, or simultaneously. Further, in some embodiments, some of the actions, acts, blocks, steps, or the like may be omitted, added, modified, skipped, or the like without departing from the scope of the disclosure.

Figure 13:
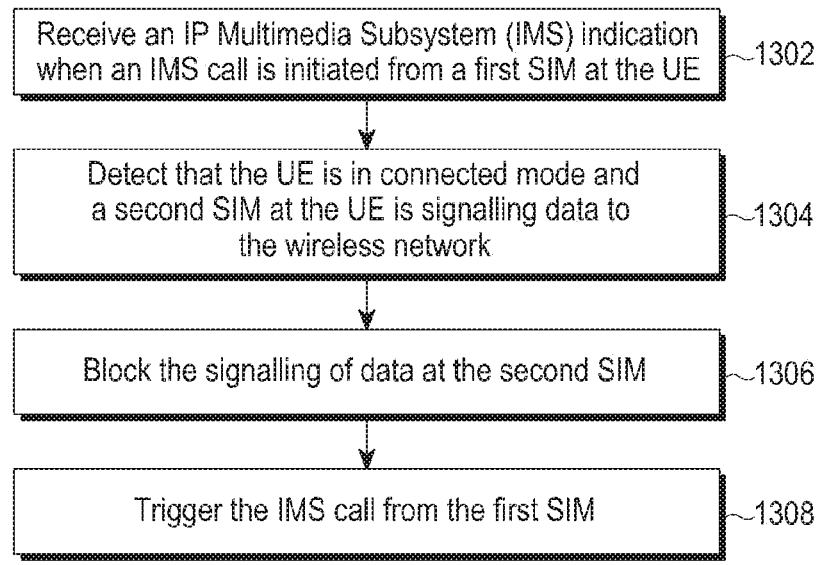
FIG. 13 is a flow diagram illustrating a method for handling an IMS call and a CSFB call at UE supporting multi SIMs, according to an embodiment of the present disclosure.

FIG. 13 is a flow diagram illustrating a method for handling an IMS call and a CSFB call at UE supporting multi SIM, according to an embodiment of the present disclosure.

In step 1302, the method includes receiving an IMS indication when an IMS call is initiated from a first SIM at the UE 102. In an embodiment, the method allows the NAS 206 to receive the IMS indication.

In step 1304, the method includes detecting that the UE 102 is in connected mode and that a second SIM at the UE 102 is signaling data to the wireless network. In an embodiment, the method allows the NAS 206 to perform the detections.

In step 1306, the method includes blocking the signaling of data at the second SIM. In an embodiment, the method allows the NAS 206 to block the signaling.

In step 1308, the method includes triggering the IMS call from the first SIM. In an embodiment, the method allows the NAS 206 to trigger the IMS call.

Further, the UE 102 supporting the multi SIM (DSDA, DSDS) is described in greater detail below with respect to FIG. 14.

The various actions, acts, blocks, steps, or the like in the method may be performed in the order presented, in a different order, or simultaneously. Further, in some embodiments, some of the actions, acts, blocks, steps, or the like may be omitted, added, modified, skipped, or the like without departing from the scope of the disclosure.

Figure 14:
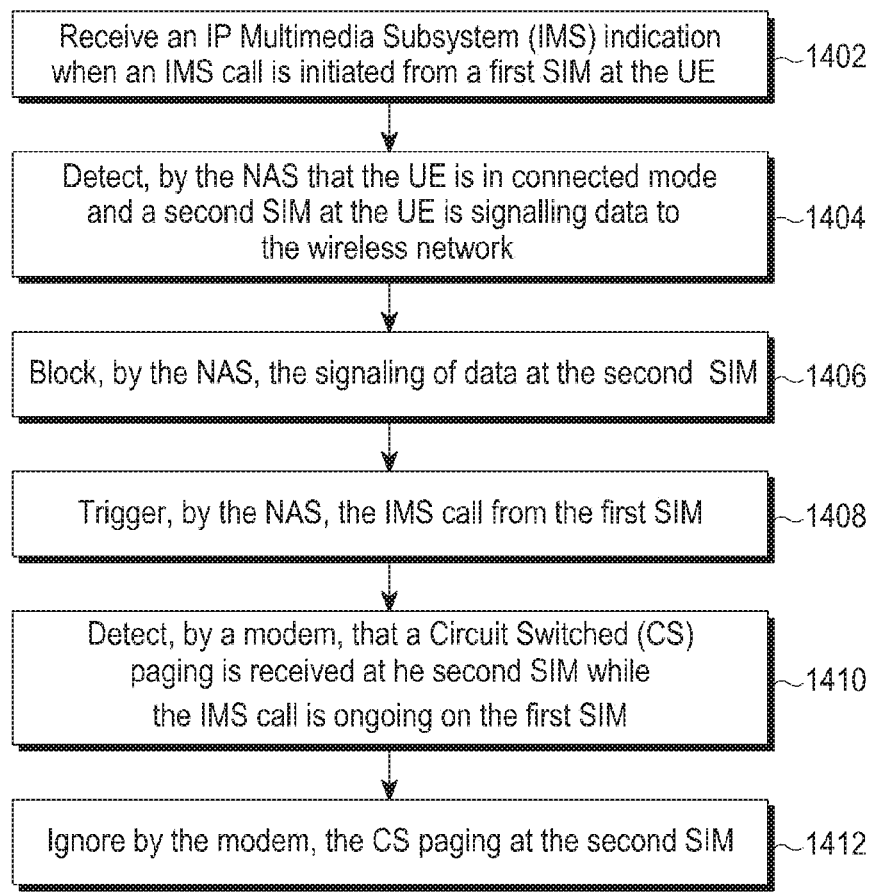
FIG. 14 is a flow diagram illustrating a method for handling an IMS call and a CSFB call at UE, during CS paging, supporting multi SIMs, according to an embodiment of the present disclosure.

FIG. 14 is a flow diagram illustrating a method for handling an IMS call and a CSFB call at UE, during CS paging, supporting multi SIM, according to an embodiment of the present disclosure.

In step 1402, the method includes receiving the IMS indication when the IMS call is initiated from the first SIM at the UE 102. In an embodiment, the method allows the NAS 206 to receive the IMS indication.

In step 1404, the method includes detecting that the UE 102 is in connected mode and that the second SIM at the UE 102 is signaling data to the wireless network. In an embodiment, the method allows the NAS 206 perform the detections.

In step 1406, the method includes blocking the signaling of data at the second SIM. In an embodiment, the method allows the NAS 206 to block the signaling.

In step 1408, the method includes triggering the IMS call from the first SIM. In an embodiment, the method allows the NAS 206 to trigger the IMS call.

In step 1410, the method includes detecting that the CS paging is received at the second SIM while the IMS call is ongoing on the first SIM. In an embodiment, the method allows the modem 210 to detect that the CS paging is received at the second SIM.

In step 1412, the method includes ignoring the CS paging at the second SIM. In an embodiment, the method allows the modem 210 to ignore the CS paging at the second SIM and continue on the VoLTE call.

The various actions, acts, blocks, steps, or the like in the method may be performed in the order presented, in a different order, or simultaneously. Further, in some embodiments, some of the actions, acts, blocks, steps, or the like may be omitted, added, modified, skipped, or the like without departing from the scope of the disclosure.

Figure 15:
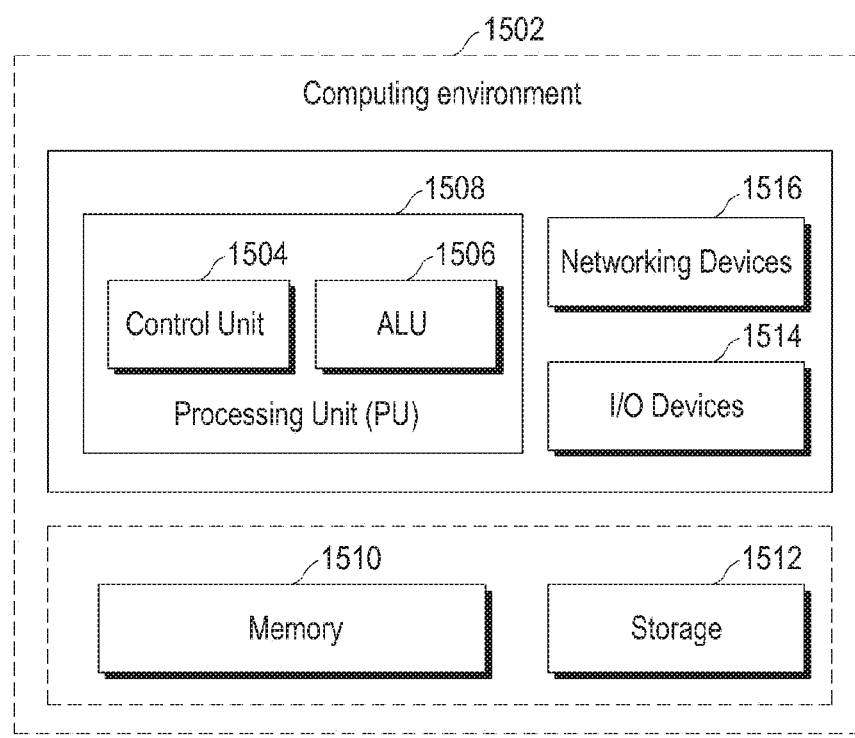
FIG. 15 is a diagram illustrating a computing environment implementing the method for handling an IMS call and a CSFB call at UE in a wireless network, according to an embodiment of the present disclosure.

FIG. 15 is a diagram illustrating a computing environment implementing the method for handing an IMS call and a CSFB call at the UE in wireless network, according to an embodiment of the present disclosure.

A computing environment 1502 comprises at least one processing unit 1508, which is equipped with a control unit 1504 and an arithmetic logic unit (ALU) 1506, a memory 1510, a storage unit 1512, a plurality of networking devices 1516, and a plurality of input/output (I/O) devices 1514. The processing unit 1508 is responsible for processing the instructions of the schemes. The processing unit 1508 receives commands from the control unit 1504 in order to perform its processing. Further, any logical and arithmetic operations involved in the execution of the instructions are computed with the help of the ALU 1506.

The overall computing environment 1502 can be composed of multiple homogeneous or heterogeneous cores, multiple central processing units (CPUs) of different kinds, special media and other accelerators. The processing unit 1508 is responsible for processing the instructions of the schemes. Further, the plurality of processing units 1508 may be located on a single chip or over multiple chips.

The scheme having instructions and codes required for the implementation are stored in the memory unit 1510, the storage 1512, or both. At the time of execution, the instructions may be fetched from the corresponding memory 1510 or storage 1512, and executed by the processing unit 1508.

In case of any hardware implementations various networking devices 1516 or external I/O devices 1514 may be connected to the computing environment to support the implementation through the networking unit and the I/O device unit.

The embodiments disclosed herein can be implemented through at least one software program running on at least one hardware device and performing network management functions to control the elements. The elements shown in the FIGS. 1 through 15 include blocks which can be at least one of a hardware device, or a combination of hardware device and software units.

The present disclosure may be utilized in conjunction with the manufacture of integrated circuits, chip sets, or system-on-chips (SoCs). One skilled in the art would know how to dice wafers and package die to produce integrated circuits. Integrated circuits so manufactured are considered part of this disclosure.

While the disclosure has been shown and described with reference to certain embodiments thereof, it will be understood by those skilled in the art that various changes in form and detail may be made therein without departing from the spirit and scope of the disclosure as defined by the appended claims.

What is claimed is:

1. A method for handling internet protocol (IP) multimedia subsystem (IMS) and circuit switch fall back (CSFB) calls at a user equipment (UE) in a wireless network, the method comprising:
   receiving, by a non-access stratum (NAS) of the UE, an IMS indication when an IMS call is initiated at the UE; and
   determining, by the NAS, a state of the UE,
   wherein, when the determined state of the UE is a state of attempting to update, the method further comprises:
   determining, by the NAS, a state of retransmission timer, and
   performing an action to trigger one of the IMS call and a CSFB call, based on the determined state of the UE and the determined state of the retransmission timer.

2. The method of claim 1, wherein, when the determined state of the retransmission timer is a state in which the retransmission timer is running, performing the action comprises:
   Indicating a failure to an IMS client;
   deleting pending data; and
   triggering the CSFB call.

3. The method of claim 1, wherein, when the determined state of the retransmission timer is a state in which the retransmission timer has expired, performing the action comprises:
   stopping the retransmission timer; and
   initiating an area update procedure with an active flag set to "true" to indicate data pending to a network entity.

4. The method of claim 3, wherein performing the action further comprises:
   detecting that an area update reject message is received from the network entity or a lower layer failure indication is received at the UE;
   indicating a failure to an IMS client; and
   triggering the CSFB call.

5. The method of claim 3, wherein performing action further comprises:
   detecting that an area update accept message is received from the network entity; and
   triggering the IMS call.

6. The method of claim 1, wherein, when the determined state of the UE is an idle mode, the method further comprises:
   sending an IMS indication in a radio resource control (RRC) connection request message to a network entity to prioritize IMS congestion over non-IMS congestion; and
   triggering the IMS call.

7. The method of claim 1, wherein determining the state of the UE comprises:
   determining, by the NAS, whether a connection to a network entity in the wireless network is successful.

8. The method of claim 1, wherein, when the determined state of the UE is a connected mode and a first subscriber identity module (SIM) at the UE is signaling data to the wireless network, the method further comprises:
   blocking, by the NAS, the signaling of data by the first SIM, and
   wherein the IMS call is from a second SIM.

9. The method of claim 8, further comprising:
   detecting, by a modem of the UE, that circuit switched (CS) paging is received at the first SIM while the IMS call is ongoing on the second SIM; and
   ignoring, by the modem, the CS paging at the first SIM.

10. A user equipment (UE) for handling internet protocol (IP) multimedia subsystem (IMS) and circuit switch fall back (CSFB) calls in a wireless network, the UE comprising:
    a memory;
    a processor; and
    a non-access stratum (NAS), coupled to the processor and memory, configured to:
    receive an IMS indication when an IMS call is initiated at the UE; and
    determine a state of the UE,
    wherein, when the determined state of the UE is a state of attempting to update, the NAS further determines a state of a retransmission timer, and performs an action to trigger one of the IMS call and a CSFB call, based on the determined state of the UE and the determined state of the retransmission timer.

11. The UE of claim 10, wherein, when the determined state of the retransmission timer is a state in which the retransmission timer is running, performing the action comprises:
    indicating a failure to an IMS client;
    deleting pending data; and
    triggering the CSFB call.

12. The UE of claim 10, wherein, when the determined state of the retransmission timer is a state in which the retransmission timer has expired, performing the action comprises:
    stopping the retransmission timer; and
    initiating an area update procedure with an active flag set to "true" to indicate data pending to a network entity.

13. The UE of claim 12, wherein performing the action further comprises:
    detecting that an area update reject message is received from the network entity or a lower layer failure indication is received at the UE;
    indicating a failure to an IMS client; and
    triggering the CSFB call.

14. The UE of claim 12, wherein performing the action further comprises:

detecting that an area update accept message is received from the network entity; and
triggering the IMS call.

15. The UE of claim 10, wherein, when the determined state of the UE is an idle mode, the NAS is further configured to:
send an IMS indication in a radio resource control (RRC) connection request message to a network entity to prioritize IMS congestion over non-IMS congestion; and
trigger the IMS call.

16. The UE of claim 10, wherein the NAS is further configured to determine whether a connection to a network entity in the wireless network is successful.

17. The UE of claim 10, wherein, when the determined state of the UE is a connected mode and a first subscriber identity module (SIM) at the UE is signaling data to the wireless network, the NAS is further configured to block the signaling of data by the first SIM, and
wherein the IMS call is from a second SIM.

18. The UE of claim 17, wherein the NAS is further configured to, when circuit switched (CS) paging is received at the first SIM while the IMS call is ongoing on the second SIM, ignore the CS paging at the first SIM.

19. A method for handling calls at a user equipment (UE) in a wireless network, the method comprising:
determining, by a non-access stratum (NAS) of the UE, whether the UE is in a tracking area update (TAU) initiated state upon initiating of an Internet protocol (IP) multimedia subsystem (IMS) call;
determining, by the NAS, whether the UE is attempting to update and one or more retransmission timers are running, when the UE is in a TAU initiated state;
triggering, by the NAS, a circuit switch fall back (CSFB) call, when at least one of the UE is not attempting to update and the one or more retransmission timers are running; and
triggering, by the NAS, the CSFB call or the IMS call in accordance with whether a TAU accept message is received, when the UE is not in a TAU initiated state or when the UE is attempting to update and one or more retransmission timers are not running.

20. The method of claim 19, wherein triggering the CSFB call or the IMS call comprises:
determining, by the NAS, whether the TAU accept message is received;
triggering, by the NAS, the CSFB call, when the TAU accept message is not received; and
triggering, by the NAS, an IMS call, when the TAU accept message is received.

21. The method of claim 20, further comprising:
indicating a TAU failure to an upper layer, when the TAU accept message is not received.

22. The method of claim 21, further comprising:
indicating a failure to an IMS client and deleting pending data, when at least one of the UE is not attempting to update and the one or more retransmission timers are running.

* * * * *